US005239756A

United States Patent [19]

Matzo et al.

[11] Patent Number: 5,239,756

[45] Date of Patent: Aug. 31, 1993

[54] HAND CIRCULAR SAW, PARTICULARLY PLUNGE SAW

[75] Inventors: David Matzo, Leinfelden-Echterdingen; Joachim Mueller; Heribert Schramm, both of Stuttgart; Steffen Wuensch, Holzgerlingen; Andreas Hoelderlin, Besigheim, all of Fed. Rep. of Germany

[73] Assignee: Robert Bosch GmbH, Stuttgart, Fed. Rep. of Germany

[21] Appl. No.: 899,484

[22] Filed: Jun. 16, 1992

[30] Foreign Application Priority Data

Jul. 22, 1991 [DE] Fed. Rep. of Germany ....... 4124232

[51] Int. Cl.[5] ...................... B23D 47/02; B23D 51/02; B23D 59/00

[52] U.S. Cl. ....................................... 30/371; 30/374; 30/377

[58] Field of Search ................. 30/371, 372, 373, 374, 30/376, 377; 83/745; 403/90, 68, 122

[56] References Cited

U.S. PATENT DOCUMENTS

| | | | |
|---|---|---|---|
| 3,468,350 | 9/1969 | Logan | 30/377 |
| 4,516,324 | 5/1985 | Heininger, Jr. et al. | 30/377 |
| 4,777,726 | 10/1988 | Flowers | 30/374 |
| 4,856,394 | 8/1989 | Clowers | 30/377 |
| 4,909,114 | 3/1990 | Astle | 83/745 |
| 4,982,501 | 1/1991 | Sauerwein et al. | 30/377 |
| 5,071,279 | 12/1991 | Rutstrom | 403/90 |

FOREIGN PATENT DOCUMENTS

| | | | |
|---|---|---|---|
| 305487 | 2/1955 | Switzerland | 30/377 |
| 2059338 | 4/1981 | United Kingdom | 30/377 |

*Primary Examiner*—Frank T. Yost
*Assistant Examiner*—Paul M. Heyrana, Jr.
*Attorney, Agent, or Firm*—Michal J. Striker

[57] ABSTRACT

A motor-driven hand circular saw, has a base plate, a motor, a drive housing surrounding the motor, a saw blade provided with saw teeth and being in operative connection with the motor, a saw blade housing accommodating the saw blade, an upwardly movable saw shaft having the saw blade, a hinge arranged so that the drive housing together with saw blade is movable upwardly and downwardly normal to the saw shaft with respect to the base plate for cutting depth adjustment. The saw blade is movable in and out. A turning hinge having a turning axis extends in a feed direction so that the saw blade housing is connected through the turning hinge with the base plate, and there is at least one upper and lower handle with respect to the base plate. The saw blade housing with the saw blade is located at the left and the drive housing is located at the right as considered in the feed direction. The hinge for cutting depth adjustment is arranged at the front side of the base plate as considered in the feed direction. The upper handle is formed as a pistol-like handle having a free end extending parallel to the feed direction and toward the base plate downwardly.

17 Claims, 3 Drawing Sheets

Fig. 5
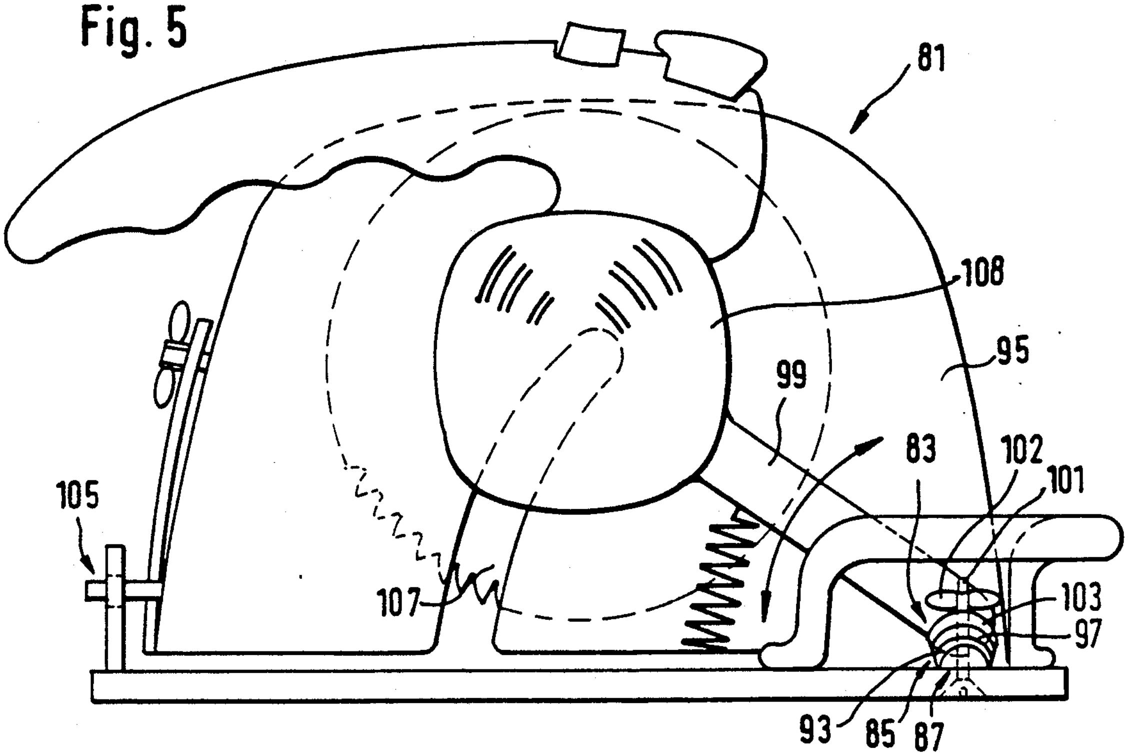
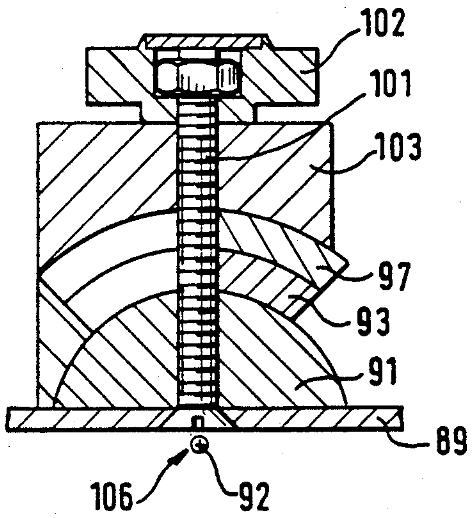
Fig. 6
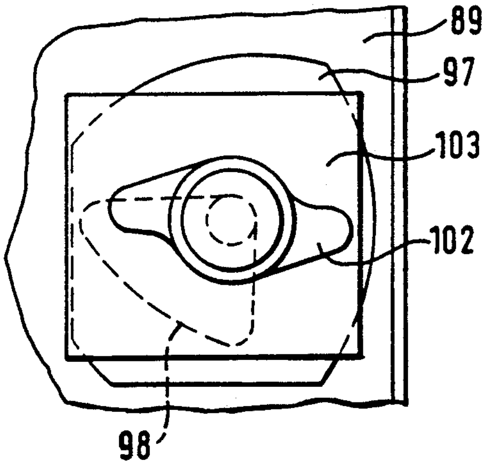
Fig. 7

HAND CIRCULAR SAW, PARTICULARLY PLUNGE SAW

BACKGROUND OF THE INVENTION

The present invention relates to a hand circular saw and in particular to a plunge saw.

Hand circular saws are generally known in the art. One of such hand circular saws is disclosed in the German document DE-OS 3,912,307. In this saw the turning point for depth adjustment is located on the base plate, in particular on its region which faces the operator, and the saw blade is turnable outwardly of a stationary housing. Moreover, the spring means acts on the plunge saw against the base plate so that it has a tendency to maintain the upper dead point position or in other words the plunge depth zero and is releasably arrested by a mechanism in the zero position.

A standard hand circular saw is also disclosed in the German document DE-OS 1,503,927. In this saw the height and inclination adjustment of the saw blade is supported in a joint spherical hinge.

All known circular saws are designed so that the saw teeth during rotation of the saw blade press against the working table during engagement into the workpiece. For hand circular saw this means that the saw teeth of the saw blade which raise with respect to workpiece or in other words in the feeding direction must provide cutting. Therefore, under the action of the cutting force the workpiece is pulled against the ground plate of the saw. The danger of sudden springing and lifting off the saw from the workpiece due to the saw teeth which cut in opposite direction is almost prevented. This action of the saw teeth is identified as a counter run. The counter run is accepted by experts for safety reasons and it is considered as a standard for all known circular saws. The opposite case or straight run is very dangerous. It must be basically avoided. For this reason, for example a reverse of the displacement of the hand circular saws against the operators is prohibited.

In order to facilitate the understanding of the following considerations and to understand the present invention the following explanations are provided hereinbelow. The feeding direction is defined as the direction from the left to the right. The geometrical observation of the hand circular saws is performed from the right side as considered in the feeding direction. The saw blade rotates to the left. The center point of the saw blade is located always, more or less, above the turning point for lifting and lowering of the saw blade. The turning point for the plunging saws is located at the left before the center point, and in standard hand circular saws at the right before the center point of the saw blade. During turning up and down the saw blade is guided over a circular path. Thereby during immersing a vertical and a horizontal feed component is produced. The horizontal feed component leads to a predominant engagement of the saw teeth in the horizontal feed direction.

For providing a counter run during immersion, from the geometrical observation, presuming a uniform rotary direction of the saw blade, the hinge for lifting and lowering the saw blade must be located at the left, or in other words facing toward the operator.

Due to the above described conditions during plunge sawing the counter run takes place with the cut performed both over the workpiece and also vertically into the workpiece. It has been considered a technical advantage with respect to the standard hand circular saws. A substantial feature of the plunge saws is therefore that in immovable position with the cutting depth "zero" the saw teeth are positioned at a substantial distance above the base plate. Thus, the saw can be placed on a workpiece reliably and flush with the base plate.

The opposite is true for the standard hand circular saws. The straight run is produced here due to the horizontal feed component directed against the feed direction during immersion of the saw blade while predominantly the saw teeth lowering in the workpiece produce cutting.

Due to the geometry of the standard hand circular saw the saw teeth during immersion of the saw blade into a workpiece operate predominantly in the straight run, this saw case must be excluded for standard hand circular saws. Therefore they are designed so that in the immovable position with the cutting depth zero the saw teeth of the saw blade facing the base plate are not only positioned at no distance above the base plate but also in many cases have an extension projecting through the base plate.

When the standard hand circular saw is placed on the workpiece, first the swinging protective hood contracts the workpiece in a ski-like manner. After its pre-opening the saw teeth which project under the base plate contact the workpiece. Thereby the base plate cannot lie flush on the workpiece and the hand circular saw tilts. This cannot be brought to the working position for plunge saws without undesired contact and damage to the workpiece surface. Thereby a misuse of the standard hand circular saw formed as a plunge saw must be prevented.

The danger of springing of the saw during immersion in direct run takes place on the account that at the beginning the saw teeth are subjected first to very asymmetrical forces which under certain condition sum up in an impact-like manner. The forces sum up during occurring alternating hard zones for example knots results in alternation of the feed pace and leads to springing of the machine with possible fatal outcome for the operator or for people around him. This is especially dangerous when these acrobatic efforts, with the mounted gap wedge with the standard hand circular saw misuse occurs for example by placing the front edge of the base plate on the workpiece with simultaneous lifting of the swinging protective hood and as a result pressing the saw downwardly so that the saw blade immerses in the workpiece.

These considerations have been followed for the last 50 years for designing special hand circular saw constructions which are different from the standard had circular saws and to which are different from the standard hand circular saws and to which the plunge saws belong. They are used in saws with blind joints in hollow panels or wood roofs or in saws for openings in cooking working plates for adjusting of flushing basis. The plunge saws perform their functions satisfactorily. The following problems have been considered as unavoidable during the manipulation: unfavorable working positions of operators, convulsions of the hand in the intersecting angled holding position, springing of the machine despite the counter run saw.

SUMMARY OF THE INVENTION

Accordingly, it is an object of the present invention to provide a plunge saw of the above mentioned general type which avoids the disadvantages of the prior art.

In keeping with these objects and with others which will become apparent hereinafter, one feature of the present invention resides, briefly stated, in a motor driven hand circular saw in which a saw blade housing with a saw blade is arranged at the left and a drive housing is arranged at the right as considered in a feed direction, a hinge for the cutting depth adjustment is arranged on the front side of the base plate as considered in the feed direction, and the upper handle is formed as a pistol-like grip extending with its free end parallel to the feed direction and to the base plate downwardly.

When the plunge saw is designed in accordance with the present invention it is substantially easier to handle and also substantially safer.

The displacement of the turning point for the cutting depth adjustment or for immersion as well as the displacement of the motor to the opposite side as compared with the conventional plunge saws, provides for a striking advantage in safety and easier maneuverability, which is further supported by the arrangement of a pistol handle. The guiding hand is always oriented on it parallel to the leading hand on the reeling-like auxiliary handle which is located deeper. During bevel and inclined cutting the guiding hand is no longer angled on the upper handle, as on the guiding handle of known plunge saws. Instead it can be relieved and extend parallel to the lower arm. By the reeling-like auxiliary handle a plurality of possible holding positions are provided for the leading hand and thereby the saw can be guided especially effort-free and more reliable and held in respective positions.

Until now all plunge saws were designed as left hand saws which, since in the most cases were used by right handed persons, were mismatched. This disadvantage is now overcome. With the present invention for the first time a directly designed right handed plunge saw is provided. This new saw type which combines the concept of the pivot and plunge saw can also overcome in surprising manner the existing prejudice against the plunge saws in direct run.

In accordance with another feature of the present invention, the arresting/clamping of the parallel abutment can be performed by a safety hinge plug on the base plate of the hand circular saw. Complicated releasing and fixing with the conventional easily loseable arresting screws is dispensed with.

In accordance with a further feature of the present invention, an especially easy and compact construction is provided when the movement of the hand circular saw relative to the base plate is performed simultaneously about two spherical hinges forming two mutually perpendicular turning axes.

The arrangement of a swinging protective hood provides immersion of the hand circular saw into a workpiece with simultaneous arresting of the cutting depth adjustment. Therefore the user protection is obtained in contrast to the existing plunge-saws with the protective hoods providing the injury protection did not insure arresting of the cutting depth.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 5 is a view showing a further embodiment of the plunge saw of the present invention;

FIGS. 6 and 7 are views showing a hinge between a base plate and the plunge saw.

DESCRIPTION OF THE PREFERRED EMBODIMENTS

Figure 1:
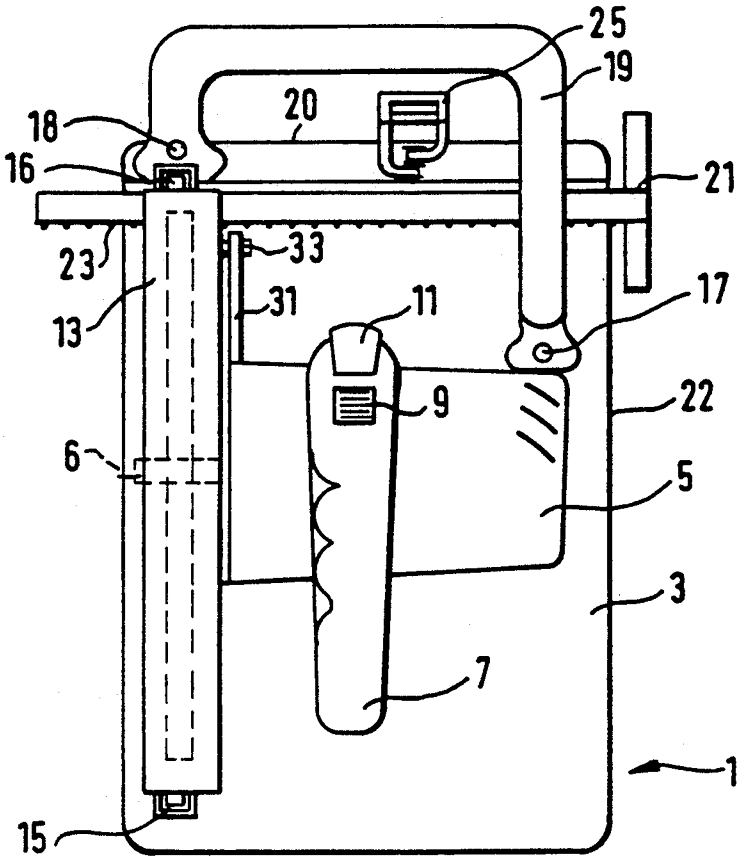
FIG. 1 is a plan view of the plunge saw in accordance with the present invention.

A plunge saw is identified in FIG. 1 with reference numeral 1 as a whole. It has a base plate 3, a drive housing 5 mounted on the base plate, a saw shaft 6 and an upper, pistol-like handle 7 accommodating an electrical on-off switch 9 and a button 11 for arresting the drive housing 5 in an upper dead point position.

A saw blade housing 13 is arranged on the base plate 3 and supported turnably about a turning axis 15, 16 together with the drive housing 5 at the left side. Additionally, the drive housing 5 with its saw shaft 6 is arranged so that it is turnable up and down with the saw shaft 6 on the saw blade housing 13 through a hinge arm 31 and a hinge 33. Moreover, a lower auxiliary handle 19 is mounted on the base plate 3 by screws 17, 18. It extends in a reeling-like manner along a front and a side edge 20, 22 of the base plate 3. The base plate further carries a side abutment 21 with a knurled longitudinal edge 23 and a displaceable springy arresting device 25 engaging with the same and formed as a spring bracket for safety hinge plug as disclosed for example in the German reference DE-OS 2,341,253.

Figure 2:
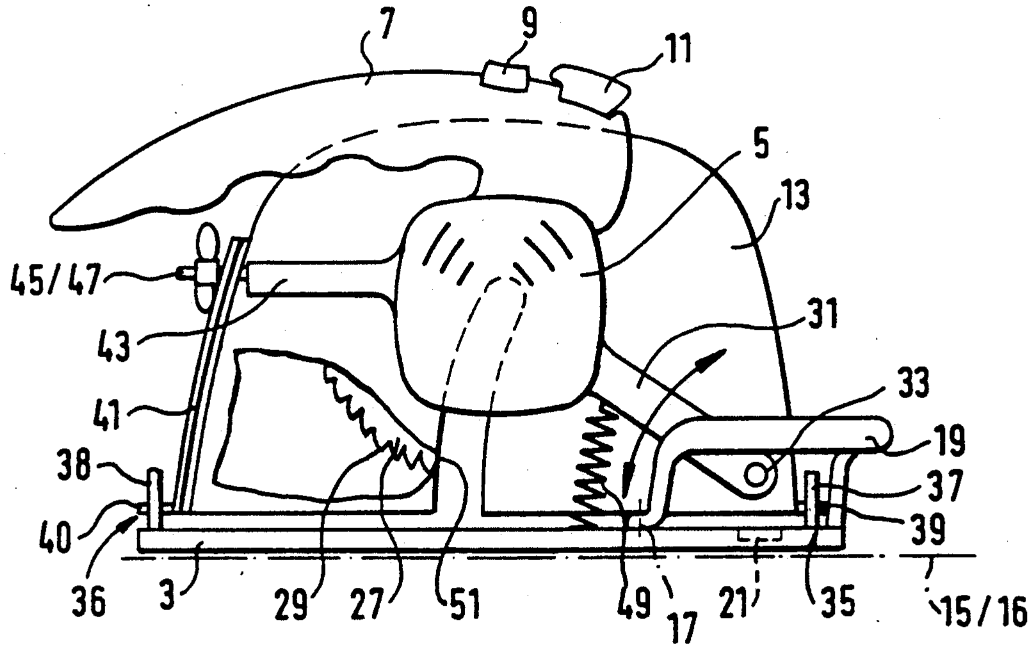
FIG. 2 is a side view of the plunge saw of the present invention.

The side view of FIG. 2 shows the base plate 3 with the saw blade housing 13 and a portion of a saw blade 27 with saw teeth 29. The saw blade housing 13 is movably supported with two coulisse-like parts 39, 40 extending in two opposite directions parallel to the base plate 3, in two turning guide parts 37, 38 mounted on the base plate 3. The curvature of the coulisse-like part 39, 40 or their curved, slot-like abutment which is not shown in detail, in the turning guide part 37, 38 define the turning axes 15, 16.

The hinge for the plunge depth adjustment is arranged laterally on the saw blade housing 13 near the coulisse-like part 39. The drive housing 5 is turnable up and down on the hinge 33 through the hinge arm 31. The handle 7 carries the on-off switch 9 as well as the arresting button 11 for releasing the upper dead point, while associated arresting mechanism is not shown.

A cutting depth guiding arm 41 is mounted at the side of the free end of the handle 7 on the saw blade housing 13. The respective cutting depth position of the drive housing 5 or the saw blade 27 can be arrested on the arm 41 through a lever arm 43 and clamped by a screw-nut combination 45, 47.

A spring 49 is arranged between the hinge arm 31 and the base plate 3 and pushes the drive housing 5 to its upper dead position which is releasable by the arresting button 11. A circular-arc shaped recess 51 is formed on the side of the saw blade housing 13 which faces the motor housing 5. The not shown saw shaft 6 can extend through the recess by changing the immersion depth.

Figure 3:
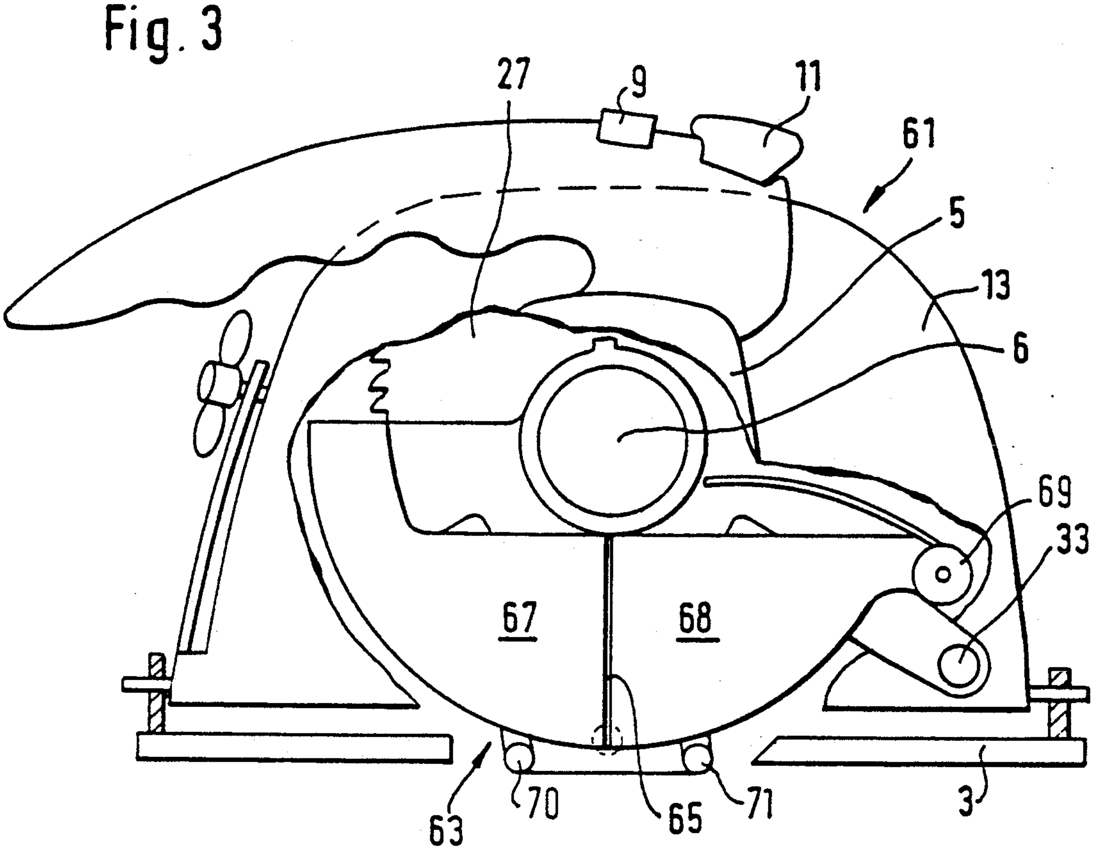
FIG. 3 is a side view of a plunge saw in accordance with a further embodiment of the invention, with a swinging protective hood.

FIG. 3 shows a plunge saw 61 which differs from the embodiment of FIG. 2 only by a swinging protective hood 63 which is turnable up and down with the motor housing 5. The swinging protective hood 63 is subdivided into two segments 67 and 68 along a separating edge 65 extending for example perpendicularly to the base plate 3. Both segments 67 and 68 are turnable jointly or individually substantially centrically around the saw shaft 6, and are turnable upwardly and downwardly together with motor housing 5 around the hinge 33. The swinging protective hood 63 surrounds the saw blade 27 inside the saw blade housing 13 and can be lifted with it after releasing the arresting button 11.

Figure 4:
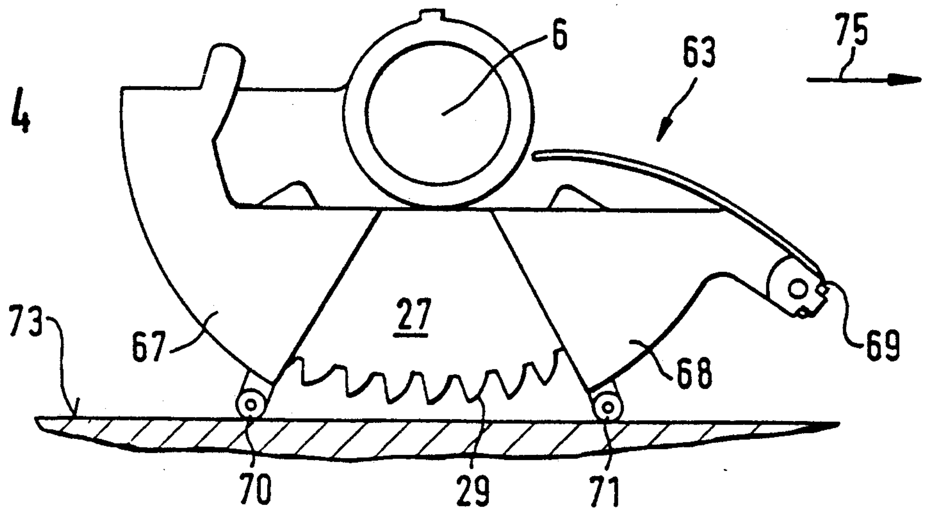
FIG. 4 is a view showing the swinging protective hood of the inventive plunge saw.

FIG. 4 shows the opened swinging protective hood 63 of FIG. 3. It can be seen that the schematically shown saw blade 27 with teeth 29 is centrally released so that a plunge cut can be performed. The rollers 70 and 71 which are supported on an upper surface 73 of the schematically shown workpiece act for the central opening of the swinging protective hood 63.

For a separating cut which extends over a workpiece surface and starts on the workpiece edge, the segment 68 is provided with a cam 69 which can be supported on a workpiece edge. Due to the feed movement of the plunge saw 1, the swinging protective hood 63 or in other words both the segment 68 and the segment 67 turn opposite to the feed direction identified by the arrow 75.

A plunge saw 81 of the example shown in FIG. 5 substantially corresponds to the above described plunge saw up to the design of the hinge 83 for the upward and downward turning of a saw blade 107 for changing the plunge or cutting depth as well as the design of a turning hinge 85 for producing inclined or bevel cuts.

The hinge 83 and the turning hinge 85 are assembled to a spherical hinge 87. The spherical hinge includes a spherical segment 91 mounted on the base plate 89 and facing with its curved side away of the base plate 89. The curved side of the spherical hinge 91 is surrounded in a shell-like manner by an extension part 93 of the saw blade housing 95. A shaped piece 97 of a hinge arm 99 is supported on the curved side of the extension part 93 which faces away of the spherical segment 91, in a spherical-trough manner and concentrically to the same center point of curvature. A screw 101 with a wing nut 102 extends through the base plate 89, the spherical segment 91, the extension part 93 and the shaped part 97. It connects the above parts radially to one another on the base plate 98 so that they are oriented to the same center point of curvature.

In the embodiment of FIG. 5 a turning hinge 105 is arranged on the opposite side of the spherical hinge 91 and shown in the same way as in FIGS. 1, 2 and 3 in double arrangement.

FIG. 6 shows an enlarged cross-section of the spherical hinge 87 shown in FIG. 5 in detail. Here the arrangement of the base plate 89, the spherical segment 91, the extension part 93, the shaped part 97 and a hinge-trough shaped supporting plate 103, as well as the screw 101 with the wing nut 102 are shown.

FIG. 7 shows a plan view of the parts of FIG. 6 with the wing nut 102, the support plate 103, the shaped part 97. The shaped part 97 has a coulisse-like, triangular recess 98 designed for its movement around the screw 102 in two initially perpendicular superimposed turning planes. Therefore the shaped part 97 together with the hinge arm 99 can be turned both up and down and also transversely to the feed direction. The extension part 93 connected with the saw blade housing 95 has also a not shown coulisse-like recess which permits its turning transversely to the feed direction. Due to this arrangement the saw blade 107 together with the motor housing 108 can be turned up and down in the saw blade housing 95 and together with the latter can be turned transversely to the feed direction.

Due to the design of the spherical hinge 87 shown in FIGS. 5–7, depending on the selection of the cutting plane of the spherical segment 91 the center point of curvature and therefore the virtual turning axis for lateral turning of the saw blade 27 can be fixed at a distance under the base plate 89. Therefore an especially precise cutting passage which is identical in all turning angular positions can be produced.

In the embodiments of FIGS. 5, 6 and 7 the swinging protective hood and the parallel abutment are not shown. However, these parts can be provided here as well in advantageous manner.

Similarly, the embodiment shown in the preceding Figures can be provided with a spherical hinge for lifting and lowering as well as for turning the saw blade as well as with a parallel abutment with spring bracket clamping.

In accordance with a not shown embodiment of the invention, the spherical hinge can be height-adjustable for example by providing lower spacer discs or rotatable ring wedges.

The design of the hand circular saw in accordance with the preceding embodiments of plunge saw is not limited only to these saws, instead it can be advantageously transferred to standard hand circular saws with swinging protective hoods. Standard hand circular saws differ from the plunge saws by a turning point which is fixedly connected with the drive housing located together with the saw blade in a feed direction before the saw blade housing, and by a turnable down saw blade housing and a swinging protective hood. Due to these differences the design of the standard hand circular saw in some details is different from the design of the plunge saw. For example, the spherical hinge is simplified in that only one single part must be movably supported. In particular, this is the part which supports the saw blade housing carrying the saw blade.

A substantial benefit for handling and safety is obtained for standard hand circular saw by extending the motor to the left side as considered in the feed direction, by corresponding reverse of the motor rotary direction so that unchanged with respect to conventional standard hand circular saws the counter run is provided.

None of the embodiments of the invention shows an arresting for the turning angular position. This arresting is formed conventionally by a circular-arc-shaped slot guide with a center of curvature on the turning axis and a pin with nut extending through it. It is similar to the cutting depth guiding arm.

It will be understood that each of the elements described above, or two or more together, may also find a useful application in other types of constructions differing from the types described above.

While the invention has been illustrated and described as embodied in a motor driven hand circular saw, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A motor-driven hand circular saw, comprising a base plate; a motor; a drive housing surrounding said motor; a saw blade provided with saw teeth and being in operative connection with said motor; a saw blade housing accommodating said saw blade; a saw shaft having said saw blade and upwardly movable with said motor; a hinge arranged so that said drive housing together with saw blade is movable upwardly and downwardly normal to said saw shaft with respect to said base plate for cutting depth adjustment, said saw blade being movable in and out; a turning hinge having a turning axis extending in a feed direction so that said saw blade housing is turnably connected through said turning hinge with said base plate, said drive housing and said saw blade housing being movable independently of one another; and at least one upper and lower handle with respect to said base plate, said hinge and said turning hinge being assembled so as to form a spherical hinge with an imaginary center of curvature located at a distance below said base plate so as to determine a position of said turning axis.

2. A motor-driven hand circular saw as defined in claim 1, wherein said spherical hinge has an upwardly convex spherical segment located on said base plate, said sw blade housing having a hollow spherical extension part supported on said spherical segment, said hinge arm having a hollow spherical shape part supported on said extension part; and further comprising a cover part having a concave side supported on said shaped part, sad spherical segment, said extension part, said shaped part and said cover part being provided with openings; and further comprising a screw bolt with a nut extending through said openings so as to connect said spherical segment, said extension part, said shaped part and said cover part with one another.

3. A motor-driven hand circular saw as defined in claim 2, wherein said extension part and said shaped part being turnable relative to one another and relative to said spherical segment, said pin, said cover part and said nut about said center of curvature.

4. A motor-driven hand circular saw as defined in claim 2, wherein said spherical segment, said extension part, and said shaped member are formed as stamped members.

5. A motor-driven hand circular saw as defined in claim 4, wherein said spherical segment, said extension part and said shaped member are formed as stamped sheet members.

6. A motor-driven hand circular saw as defined in claim 2, wherein said cover part narrowly surrounds said bolt, said extension part and said shaped part surrounding said bolt with a play so that said opening is coulisse-like, said extension part and said shaped part are turnable relative to said center of curvature in predetermined planes.

7. A motor-driven hand circular saw as defined in claim 1, wherein said saw blade housing with said saw blade being located at the left and said drive housing being located at the right as considered in the feed direction, said hinge for cutting depth adjustment being arranged at the front side of said base plate as considered in said feed direction, said upper handle being formed as a pistol-like handle having a free end extending parallel to said feed direction and toward said base plate downwardly.

8. A motor-drive hand circular saw as defined in claim 1, wherein said upper handle has a direction and a shape positioning an operator at the left near the hand circular saw as considered in said feed direction, so that it is adjusted to a natural gripping position of a right hand and its finger, while said lower handle adapted for a left hand, 9. A motor-driven hand circular saw as defined in claim 8, wherein said base plate has a front edge and a side edge, said lower handle extends U-shaped and parallel to said base plate and also formed as a railing extending along said front and side edges.

10. A motor-driven hand circular saw as defined in claim 8, wherein said lower handle is releasably mounted on said base plate.

11. A motor-driven hand circular saw as defined in claim 1; and further comprising a swinging protective hood which is closeable with spring bias and composed of two segments swingable independently from one another.

12. A motor-driven hand circular saw as defined in claim 11, wherein said segments include a front segment and a rear segment as considered in said feed direction, said front segment being turnable at least forwardly or rearwardly while said rear segment being turnable only rearwardly, said both segments being in abutment against a workpiece and normally to an upper surface of a workpiece.

13. A motor-driven hand circular saw as defined in claim 12, wherein said front segment is turnable forwardly and rearwardly.

14. A motor-driven hand circular saw as defined in claim 11; and further comprising rollers arranged on said segments so that in an upper dead point position of said saw blade that are located near said base plate and by pressing said rollers against the workpiece said segments are spread open from one another.

15. A motor-driven hand circular saw as defined in claim 1; and further comprising a spring bracket and a side abutment which is arrestingly clampable on said base plate by said spring bracket.

16. A motor-driven hand circular saw as defined in claim 1, wherein the hand circular saw is formed as a pivot hand circular saw, said saw blade housing together with said drive housing forming a fixedly connected unit which is turnable upwardly and downwardly.

17. A motor-driven hand circular saw as defined in claim 16, wherein said spherical hinge has an upwardly convex spherical segment located on said base plate, said saw blade housing having a hollow spherical extension part supported on said spherical segment; and further comprising a cover part supported on said extension part, said extension part being provided with a coulisse-shaped opening; and a screw bolt extending through said coulisse-opening and provided with a nut so as to axially fix said spherical segment, said extension part, said cover plate with one another, said extension part being turnable relative to said spherical segment, said bolt, said cover part and said nut about a center of curvature.

* * * * *